United States Patent [19]

Koda

[11] 4,213,685

[45] Jul. 22, 1980

[54] FOLDING TYPE PHOTOGRAPHIC CAMERA

[75] Inventor: Takao Koda, Omiya, Japan

[73] Assignee: Fuji Photo Optical Co., Ltd., Saitama, Japan

[21] Appl. No.: 12,230

[22] Filed: Feb. 14, 1979

[30] Foreign Application Priority Data

Feb. 18, 1978 [JP] Japan .................................. 53-17915

[51] Int. Cl.² .......................................... G03B 17/04
[52] U.S. Cl. ................................................. 354/193
[58] Field of Search .............. 354/187, 192, 193, 194, 354/287, 288

[56] References Cited

U.S. PATENT DOCUMENTS

| 785,239 | 3/1905 | Thornton | 354/194 |
| 3,693,526 | 9/1972 | Harvey | 354/187 |

*Primary Examiner*—John Gonzales

[57] ABSTRACT

In a folding type camera, a taking lens is supported by a lens supporting member. The lens supporting member is swung about an axis disposed adjacent to an upper edge of a housing provided in the front face of a camera body and is swingable between a forwardly projected position and a folded position retained in the housing. When the lens supporting member is in the folded position, there is formed a space between the lower end of the lens supporting member and the lower inside edge of the housing. The space is closed by an auxiliary closure member swingable about an axis adjacent to the lower edge of the housing. The auxiliary closure member is swung inwardly and outwardly pushed by the free end of the lens supporting member when it is swung back and forth, and returns to its original position when the free end of the lens supporting member clears the upper end of the auxiliary closure member.

3 Claims, 8 Drawing Figures

FOLDING TYPE PHOTOGRAPHIC CAMERA

BACKGROUND OF THE INVENTION

1. Field of the Invention

This invention relates to a photographic camera, and more particularly to a folding type photographic camera in which a taking lens is movable between a photographing position away from the camera body and a housed position in the close vicinity of the camera body to reduce the entire thickness of the camera.

2. Description of the Prior Art

There have been known various types of folding cameras in which a taking lens is carried by a movable lens supporting member and is moved to a position away from the camera body when photographing and is normally retained in a housing provided in the front face of the camera body.

Among such folding cameras, this invention is particularly concerned with a type in which the taking lens is carried by an L-shaped lens supporting member comprising a first plate portion swingably supported at the first end thereof by the front face of the camera body along one edge of an open-ended housing provided therein, and a second plate portion or a lens board which is secured at its first end to the other or second end of the first plate portion to extend substantially perpendicular thereto and is provided with an opening in which the taking lens is supported. The taking lens is connected to the camera body by a flexible light-tight shielding member such as a bellows which encloses a path of the light from the taking lens to the film in the camera when the camera is in an expanded photographing position.

Thus the lens supporting member can be swung between a folded position and an expanded position. The first plate portion extends substantially in parallel to the front face of the camera body to close the open end of the housing and the lens board is retained in the housing when the lens supporting member is in the folded position. While the first plate portion projects forward from the front face of the camera body and the lens board extends in parallel to the front face of the camera body to bring the taking lens to its photographing position when the lens supporting member is in the expanded position.

Thus, in the folding camera of this type, the other or second end of the lens board opposite to the first end secured to the first plate portion must clear the inside edge of the housing remote from the edge about which the first plate portion swings. The distance of the second end of the lens board from the axis of swing of the first plate portion is larger than that of the first end of the lens board or the second end of the first plate portion from the axis of swing of the first plate portion. Therefore, the open end of the housing cannot be completely closed by the first plate portion and an undesirable small space or a clearance remains between the second end of the first plate portion and the inside edge of the housing.

If the housing is not completely closed when the camera is in its folded position or when the camera is not used, the taking lens cannot be effectively protected against scratches or dust. Further, the remaining space spoils the external appearance of the camera.

SUMMARY OF THE INVENTION

Accordingly, the primary object of the present invention is to provide an improved folding type camera in which the open end of the housing can be completely closed when the camera is in its folded position.

The folding type camera of this invention is provided with an auxiliary closure member which is dimensioned to close the space between the second end of the first plate portion of the lens supporting member and the inside edge of the housing. The auxiliary closure member is swingable about an axis extending in parallel and adjacent to the inside edge of the housing remote from the axis of swing of the lens supporting member and is held in an upright position where it extends substantially in parallel to the front face of the camera body to completely close said space by means of a spring means.

When the lens supporting member is swung toward its folded position from its expanded position, the auxiliary closure member is swung inwardly into the housing pushed by the second edge of the lens board thereby permitting the further movement of the lens supporting member, and returns to its upright position by the force of the spring means when the second edge of the lens board clears the free edge thereof. When the lens supporting member is swung toward its expanded position from its folded position, the auxiliary closure member is swung outwardly pushed by the second edge of the lens board and returns to its upright position by the force of the spring when the second edge of the lens board clears the free edge thereof.

DETAILED DESCRIPTION OF THE INVENTION

Figure 1:
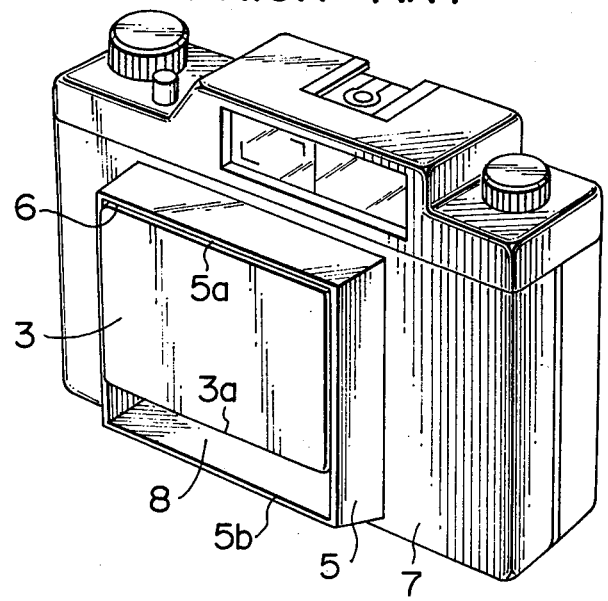
FIG. 1 is a perspective view of a conventional folding type camera in its folded position.
Figure 2:
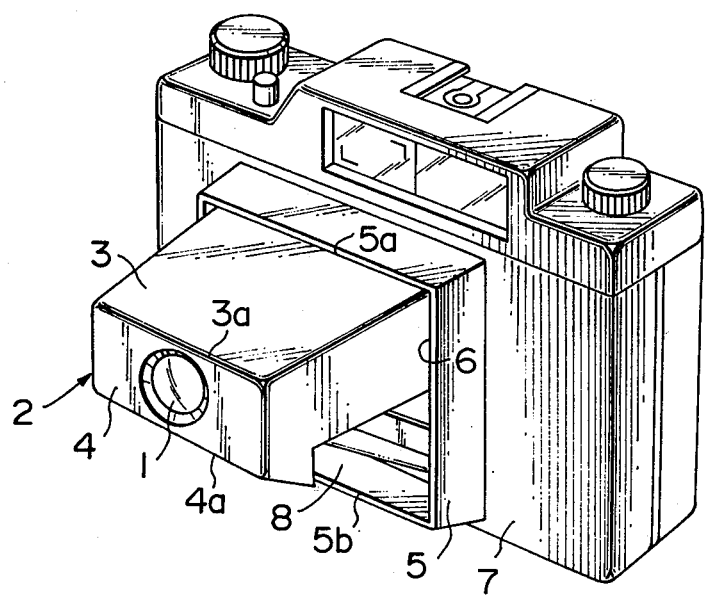
FIG. 2 is a perspective view of the folding type camera shown in FIG. 1 in its expanded position.

FIG. 1 is a perspective view of an example of a conventional folding type camera in its folded position and FIG. 2 is a perspective view thereof in its expanded position.

In the camera of this example, a taking lens 1 is supported by a lens supporting member 2 comprising a first plate portion 3 and a second plate portion or a lens board 4. A substantially rectangular housing frame 5 defining therein a housing 6 for retaining the taking lens 1 together with the lens board 4 is secured to the front face of the camera body 7. The first plate portion 3 is supported at its first end for swinging movement about an axis extending in parallel and adjacent to the upper edge 5a of the housing frame 5. To the second end 3a of the first plate portion 3 opposite to the first end is connected the upper edge of the lens board 4 so that the lens board 4 extends substantially perpendicular to the first plate portion 3.

The taking lens 1 is held in an opening formed in the lens board 4 and connected to the lens body 7 by a light tight bellows (not shown) as is well known in the art.

The lens supporting member 2 is movable between a folded position and an expanded position as shown respectively in FIGS. 1 and 2. When the lens supporting member 2 is in the folded position, the lens board 4 together with the taking lens 1 is retained in the housing 6 and the first plate portion 3 extends in parallel to the front face of the camera body 7 to close the housing 6.

When photographing, the supporting member 2 is swung to the expanded position in which the first plate portion 3 projects forward from the front face of the camera body 7 and the lens board 4 lies in parallel to the front face.

Figure 3:
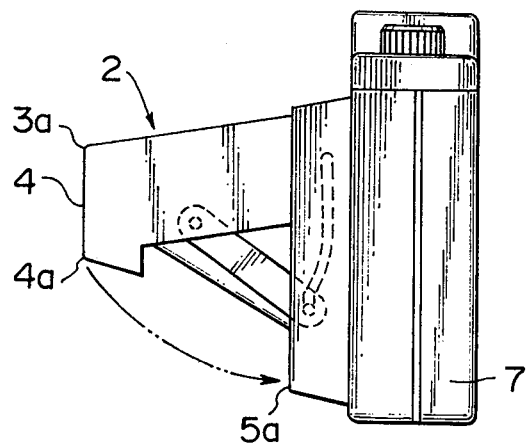
FIG. 3 is a side view of the folding type camera.

When the supporting member 2 is swung back and forth, the lower edge 4a of the lens board 4 is moved along a path which is farther from the axis of swing of the supporting member 2 than a path along which the second end 3a of the first plate portion 3 is moved as indicated by dotted lines in FIG. 3. The distance between the axis of swing of the lens supporting member 2 and the lower inside edge 5b of the housing frame 5 should be larger than that between the axis of swing and the lower edge 4a of the lens board 4 so that the lower edge 4a can clear the lower edge 5b of the housing frame. Accordingly, the second end 3a of the first plate portion 3 is positioned opposite to and away from the lower inside edge 5b of the housing frame 5 and a space 8 remains therebetween when the lens supporting member 2 is in its folded position.

In accordance with the present invention, the space 8 between the second end 3a of the first plate portion 3 and the lower inside edge 5b of the housing frame 5 is closed with an auxiliary closure member.

Now the preferred embodiments of the present invention will be described hereinbelow referring to FIGS. 4 to 8.

Figure 4:
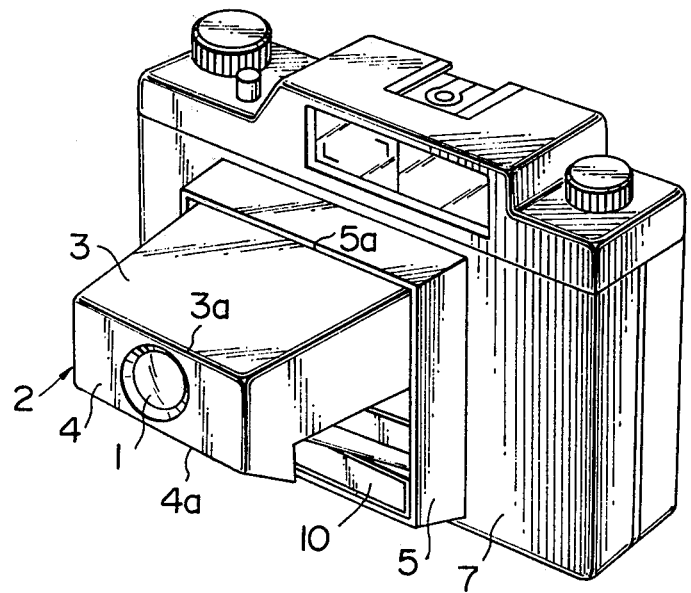
FIG. 4 is a perspective view of a folding type camera in accordance with an embodiment of the present invention.
Figure 5:
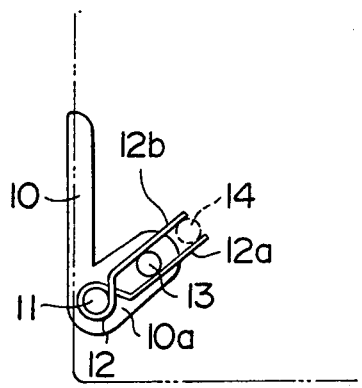
FIG. 5 is a fragmentary side view showing an example of an auxiliary closure member.

As shown in FIG. 4, the space 8 is closed by an auxiliary closure member 10 in accordance with an embodiment of the present invention. The auxiliary closure member 10 is substantially of an elongated rectangular shape and is supported for swinging movement at its lower edge by a pin 11 (see FIG. 5) extending in parallel to and adjacent to the lower inside edge 5b of the housing frame 5. The auxiliary closure member 10 is normally held in an upright position as shown in FIG. 5 by means of a neutral spring 12. The neutral spring 12 has a pair of legs 12a and 12b and is mounted on the pin 11 with the legs 12a and 12b extending on opposite sides of stud pins 13 and 14 respectively fixed to an extension 10a of the auxiliary closure member 10 and the camera body 7.

When the supporting member 2 is swung inwardly toward the folded position from the expanded position, the auxiliary closure member 10 is pushed and swung inwardly by the lower edge 4a of the lens board 4 and permits further movement of the supporting member 2. Then, the auxiliary closure member 10 returns to the upright position by the force of the spring 12 to close the spacing 8 between the second end 3a of the first plate portion 3 and the lower inside edge 5b of the housing frame 5, when the lower edge 4a clears the upper edge of the auxiliary closure member 10.

When the supporting member 2 is swung outwardly toward the expanded position from the folded position, the auxiliary closure member 10 is pushed and swung outwardly by the lower edge 4a of the lens board 4, and returns to the upright position by the force of the spring 12 when the lower edge 4a clears the upper edge thereof.

In accordance with another embodiment of the present invention, the auxiliary closure member comprises two parts as will be described hereinbelow referring to FIGS. 6 to 8. The auxiliary closure member 20 of this embodiment comprises a base plate 21 and a cover plate 22. The base plate 21 is supported for swinging movement at its intermediate portion by a pin 23 and urged inwardly toward the housing 6 by means of a tension spring 24 opposite ends of which are respectively secured to the base plate 21 and a pin 24a mounted on the camera body 7. The cover plate 22 is supported for swinging movement at its lower edge on a pin 25 mounted on the base plate 21 and urged outwardly or in the counterclockwise direction in FIG. 6 relative to the base plate 21 by means of a spring 26. The lower part of the cover plate 22 abuts against the inner surface of the upper part of the base plate 21 with the outer surface of the upper part of the cover plate 22 extending substantially flush with the outer surface of the upper part of the base plate 21. The outward swinging movement of the cover plate 22 relative to the base plate 21 is limited by the abutment of the lower part of the cover plate 22 and the upper part of the base plate 21.

Figure 6:
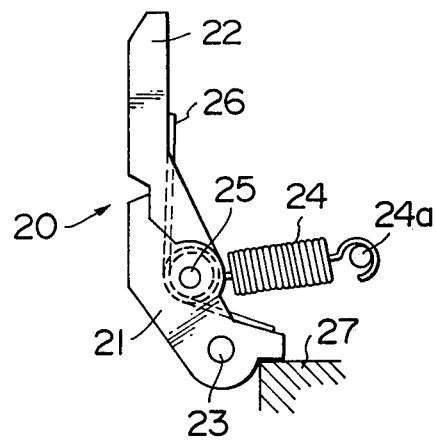
FIGS. 6 to 8 are fragmentary side views showing different positions of a modified example of an auxiliary closure member.

The inward swinging movement of the base plate 21 is limited by abutment of the lower edge thereof on a shoulder 27 provided on the camera body and the base plate 21 is normally held in the upright position as shown in FIG. 6.

Figure 8:
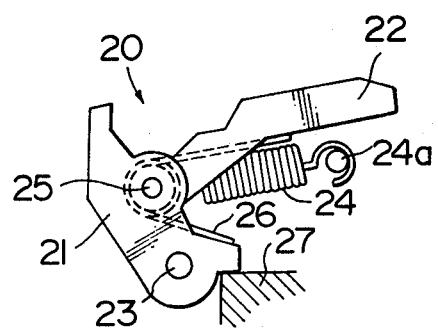

When the lens supporting member 2 is swung toward the folded position from the expanded position, the cover plate 22 is swung inwardly about the pin 25 pushed by the lower edge 4a of the lens board 4 overcoming the force of the spring 26 as shown in FIG. 8 and returns to the upright position shown in FIG. 6 by the force of the spring 26 when the lower edge 4a of the lens board 4 clears the upper edge of the cover plate 22.

Figure 7:
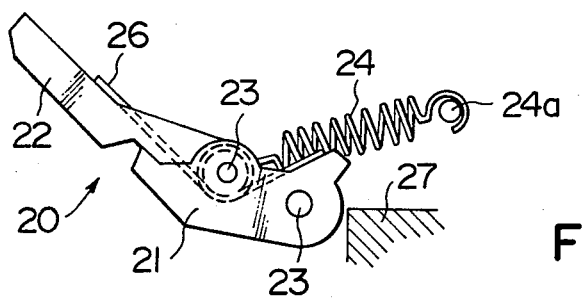

When the lens supporting member 2 is swung toward the expanded position from the folded position, the cover plate 22 is swung outwardly together with the base plate 21 pressed by the lower edge 4a of the lens board 4 overcoming the force of the spring 24 as shown in FIG. 7, and returns to the upright position by the force of the spring 24 when the lower edge 4a clears the upper edge of the cover plate 22.

I claim:

1. A folding photographic camera comprising a camera body having a housing in the front face thereof; a lens supporting member including a first plate portion supported at one end thereof on the camera body for swinging movement about an axis adjacent to a first edge of the housing and a second plate portion connected at one edge thereof to the other end of the first plate portion; and a taking lens supported in an opening provided in the second plate portion, said lens supporting member being swingable about said axis between a folded position in which said first plate portion extends substantially in parallel to the front face of the camera body to close the housing with the other end spaced from a second edge of the housing remote from said first edge thereof and the second plate portion together with the taking lens is housed in the housing, and an expanded position in which said first plate portion projects forward from the front face of the camera body and the second plate portion extends in parallel to the front face of the camera body with the taking lens supported in its photographing position, wherein the improvement comprises an auxiliary closure member which closes the space formed between the other end of the first plate portion and the second edge of the housing when the lens supporting member is in the folded position, said auxiliary closure member being swingable about an axis adjacent to the second edge of the housing and being normally resiliently held in a closing position in which it closes said space so that it is swung inwardly into the housing or outwardly away therefrom pushed by the other edge of the second plate portion when the lens supporting member is moved back and forth between the expanded position and the folded position and returns to the closing position when the other edge of the second plate portion clears the free edge thereof.

2. A folding photographic camera as defined in claim 1 wherein said auxiliary closure member is held in the closing position by means of a neutral spring which has a spring force for returning the auxiliary closure member to the closing position when the auxiliary closure member is swung in either direction from the closing position.

3. A folding photographic camera as defined in claim 1 wherein said auxiliary closure member comprises a first closure element swingable about an axis adjacent to said second edge of the housing and a second closure element supported on the first closure element for swinging movement, said first closure element being urged inwardly with the swinging movement thereof beyond its closing position prevented, a part of said second closure element being superposed with the free end portion of the first closure element so that the second closure element projects beyond the free end of the first closure element, and the second closure element being urged outwardly with the swinging movement thereof beyond the free edge of the first closure element prevented by the abutment of said part thereof and the free end portion of the first closure element, whereby only the second element is swung inwardly when said lens supporting member moves toward the folded position and the first and second closure elements are both swung outwardly when the lens supporting member moves toward the expanded position.

* * * * *